(12) United States Patent
Mehrabanzad et al.

(10) Patent No.: US 6,594,306 B1
(45) Date of Patent: Jul. 15, 2003

(54) METHOD AND APPARATUS FOR A START-UP PROCEDURE FOR DIGITAL AND ANALOG MODEMS UTILIZING PULSE CODE MODULATION FOR DATA TRANSMISSION

(75) Inventors: Sepehr Mehrabanzad, Southborough, MA (US); Dae-young Kim, Lexington, MA (US); John Pilozzi, Plainville, MA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/390,106

(22) Filed: Sep. 3, 1999

(51) Int. Cl.[7] .............................. H04B 1/38; H04B 14/04
(52) U.S. Cl. ...................................... 375/222; 375/242
(58) Field of Search .................... 375/222, 229, 375/231, 295, 316, 242, 243, 254, 377; 379/93.01

(56) References Cited

U.S. PATENT DOCUMENTS

| | | | |
|---|---|---|---|
| 4,884,285 A | 11/1989 | Heynen et al. | |
| 5,463,661 A | 10/1995 | Moran, III et al. | |
| 5,475,711 A | 12/1995 | Betts et al. | |
| 5,663,982 A * | 9/1997 | Hodge et al. | ............... 375/222 |
| 5,754,594 A | 5/1998 | Betts et al. | |
| 5,801,695 A | 9/1998 | Townshend | |
| 5,835,538 A | 11/1998 | Townshend | |
| 5,875,229 A | 2/1999 | Eynboglu et al. | |
| 5,887,027 A | 3/1999 | Cohen et al. | ............... 375/222 |
| 5,970,100 A * | 10/1999 | Olafsson et al. | ............ 375/296 |
| 6,052,412 A | 4/2000 | Ruether et al. | |
| 6,198,776 B1 * | 3/2001 | Eyuboglu et al. | ........... 375/286 |
| 6,236,676 B1 * | 5/2001 | Shaffer et al. | ............... 375/222 |
| 6,266,376 B1 * | 7/2001 | Pilozzi et al. | ............... 375/254 |
| 6,404,809 B1 * | 6/2002 | Zhang | ......................... 375/232 |
| 6,408,021 B1 * | 6/2002 | Mehrabanzad et al. | ..... 375/222 |
| 6,456,651 B1 * | 9/2002 | Pilozzi et al. | ............... 375/222 |

OTHER PUBLICATIONS

Humblet et al., "The Information Driveway," Institut Eurecom, Sophia–Antipolis, France, Oct. 29, 1995, pp. 1–23.
Chame, "A Digital Signal Processor Yields Enhanced Data/FAX Pump," IEEE, pp. 115–128 (1997).

* cited by examiner

Primary Examiner—Tesfaldet Bocure

(57) ABSTRACT

In order to achieve reliable and efficient communication over public switched telephone networks (PSTN), voiceband modems utilize sophisticated start-up procedures. This invention involves a start-up procedure that allows an analog modem and a digital modem to establish a dial-up connection that utilizes PCM modulation in both upstream and downstream directions for data transmission.

86 Claims, 3 Drawing Sheets

METHOD AND APPARATUS FOR A START-UP PROCEDURE FOR DIGITAL AND ANALOG MODEMS UTILIZING PULSE CODE MODULATION FOR DATA TRANSMISSION

FIELD OF THE INVENTION

The present invention relates generally to the field of telecommunications, and more particularly to a method and apparatus for a start-up procedure for digital and analog modems using pulse code modulation for data transmission.

BACKGROUND OF THE INVENTION

In order to achieve reliable and efficient communication over Public Switched Telephone Network (PSTN), voiceband modems go through sophisticated startup procedures. There are international standards defined by the International Telecommunications Union (ITU) that define these procedures for modems operating with different speeds. For example, ITU Recommendations V.22, V.32, V.34, and most recently V.90. These standards define the transmitter operation for modems on each end. Each individual modem vendor designs the receiver structure; however, it shall comply with the transmitter function as defined by the standard.

ITU Recommendation V.90 specification takes advantage of the fact that today's networks including the PSTN are mostly digital and it is only the"last mile" that still utilizes analog technology. ITU Recommendation V.90 specification specifies the mode of operation when the network topology is such that one end is digitally connected. In this scenario, one modem is connected to the PSTN via digital means, hence called the digital modem, and the other is connected via analog local loop, hence called the analog modem. In this topology, the modulation schemes in the upstream and downstream directions are different. In the downstream direction (from the digital modem to the analog modem) Pulse Code Modulation (PCM) scheme is used. In the upstream direction (from the analog modem to digital modem) the quadrature amplitude modulation (QAM) scheme as defined by the ITU Recommendation V.34 is used.

ITU Recommendation V.90 increased downstream rates nearly to the theoretical limit. However, upstream rates are still limited by the analog modulation of ITU Recommendation V.34. The achievable rates in the upstream direction can be increased if the PCM modulation is used. There are known PCM modulation schemes, as described in U.S. application Ser. No. 08/724,491, entitled, Hybrid Digital/Analog Communication Device, which is assigned to the assignee of the present invention and which is incorporated herein in its entirety by reference.

Therefore, a need exists for a method and apparatus that specifies a start-up procedure that allows the analog modem to achieve a higher connect speed for reliable data transmission using the PCM scheme in the upstream direction.

SUMMARY OF THE INVENTION

In the preferred embodiment of the present invention, a method of performing a start-up procedure for digital and analog modems over a communication channel having upstream and downstream directions is described to include the steps of sending a plurality of signals from the analog modem to the digital modem in the upstream direction over the communication channel where the digital modem receives the plurality of signals through the communication channel and calculates the characteristics of the communication channel in the upstream direction from the received plurality of signals. The method also includes the step of the digital modem determining a parameter set for the analog modem utilizing the characteristics, and the analog modem utilizing the parameter set to commence data transmission utilizing a pulse code modulation scheme in the upstream direction over the communication channel.

In a further embodiment of the present invention, an apparatus for performing a start-up procedure is described to include a first structure of a transmitter in the analog modem for sending a first plurality of signals in the upstream direction during the start-up procedure and a second structure of a transmitter in the analog modem for sending a second plurality of signals for data transmission utilizing pulse code modulation.

BRIEF DESCRIPTION OF THE DRAWINGS

The above-mentioned and other features of the invention will now become more apparent by reference to the following description taken in connection with the accompanying drawings in which.

DETAILED DESCRIPTION OF THE PREFERRED EMBODIMENT

Figure 1:
FIG. 1 is a block diagram of a prior art of traditional analog modem to analog modem communication system as defined by ITU Recommendations V.34, V.32, V.22bis, V.22, V.21, etc.

Referring now to FIG. 1, a traditional analog modem arrangement is shown as known in the art, where both ends are connected to the network via analog means. The same modulation scheme is used for both directions of data transmission. This arrangement represents traditional analog modems such as ITU Recommendations V.34, V.32bis, V.32, V.22bis, V.22, V.21, etc.

Figure 2:
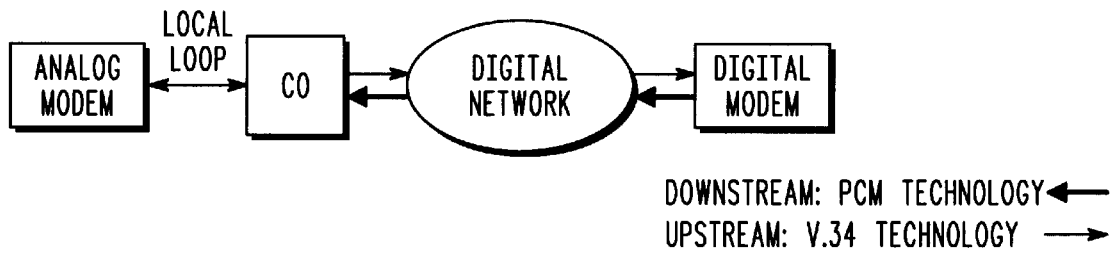
FIG. 2 is a block diagram of a prior art analog PCM modem to digital PCM modem communication system as defined by ITU Recommendation V.90.

Referring now to FIG. 2, a PCM modem communication system is shown, as known in the art, where one end is connected to the network via analog means and the other end is connected to the network via digital means, and where modulation in the upstream direction of the communication channel is defined by ITU Recommendation V.34, and where modulation in the downstream direction of the communication channel utilizes pulse code modulation (PCM) as defined in ITU Recommendation V.90.

Figure 3:
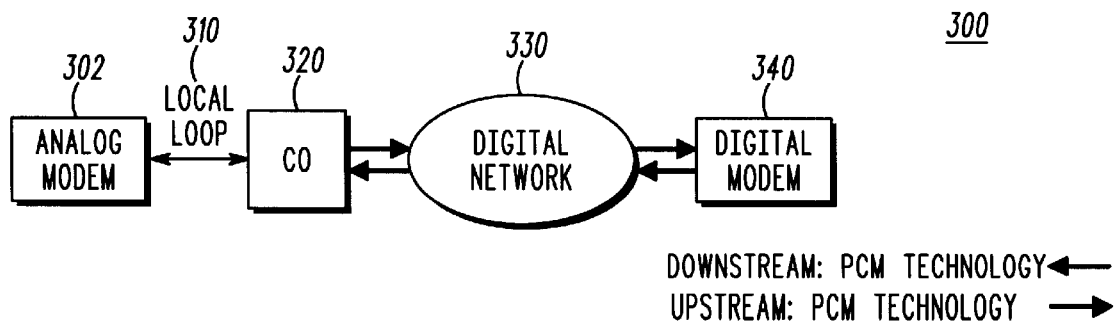
FIG. 3 is a block diagram of an analog PCM modem to digital PCM modem communication system that utilizes PCM modulation in both directions of data transmission.

Referring now to FIG. 3, there is shown a PCM communication system 300. System 300 includes analog PCM modem 302 connected to a telephone company central office (CO) 320 equipment over a local analog loop or channel 310. The CO equipment contains circuitry that includes, but is not limited to, an Analog-to-Digital converter (A/D) and a Digital-to-Analog converter (D/A). ITU Recommendation G.711 defines the characteristics and operational procedures for all A/D and D/A converters. There is also included a digital network 330 which is interconnected to CO 320 and to digital PCM modem 340. With this system, data may be transmitted both in the downstream direction (i.e., from digital PCM modem 340 to analog PCM modem 302) and in the upstream direction (i.e., from analog PCM modem 302 to digital PCM modem 340) using PCM modulation. This type of bidirectional PCM communication system is described in U.S. application Ser. No. 08/724,491, entitled, *Hybrid Digital/Analog Communication Device.*

Figure 4:
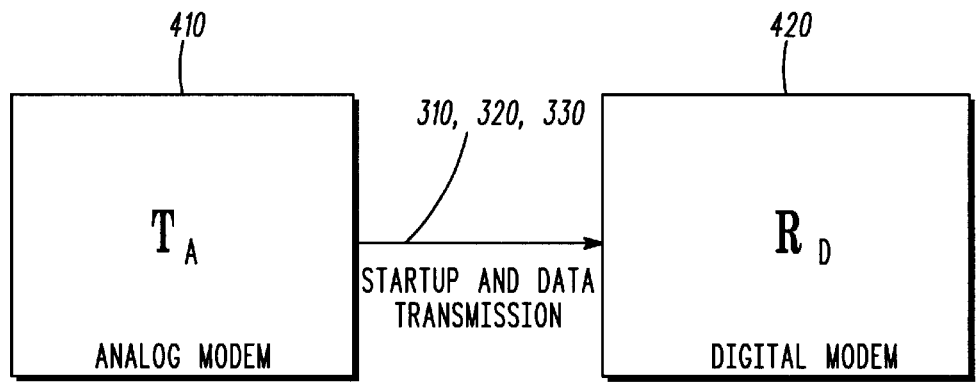
FIG. 4 is a block diagram illustrating a prior art system of an analog modem transmitter device and a digital modem receiver device.

Referring now to FIG. 4, in the prior art system of PCM modem connection as shown in FIG. 2, the PCM analog modem is shown to have a transmitter device with one structure, Ta, 410, and the PCM digital modem of FIG. 2 is shown to have a receiver device with one structure, Rd, 420. Transmitter device Ta, 410 of PCM analog modem 210 communicates over the communication channel 310, 320, and 330 with the receiver device Rd, 420 of the digital PCM modem 250 as shown in FIG. 2.

In prior art communication systems such as those described in FIG. 2 there is one type of transmitter structure in the transmitter device of the PCM analog modems for both the start-up (ie. training) and data transmission. It should be noted that the receiver device of the digital modem, Rd, 420 is accorded to a particular structural implementation dependent on the type of transmitter device Ta, 410.

Figure 5:
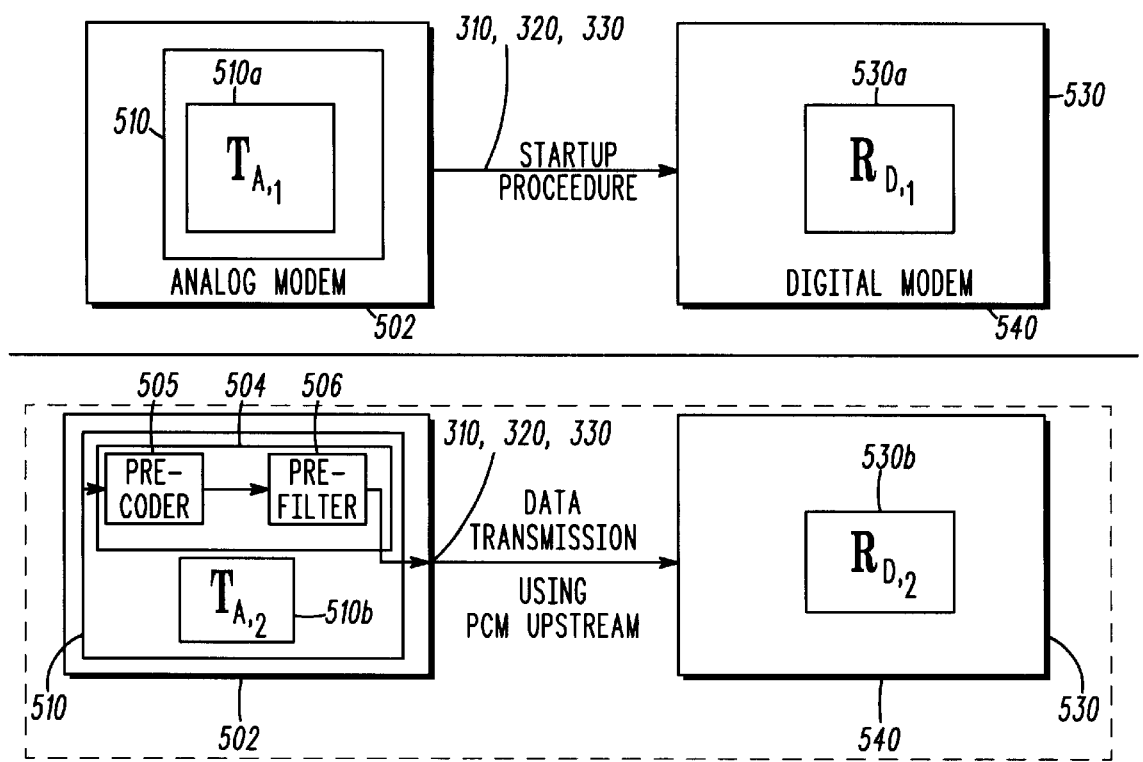
FIG. 5 is a block diagram illustrating a preferred embodiment of the present invention of an analog modem transmitter device and a digital modem receiver device.

In a preferred embodiment of the present invention, as shown in FIGS. 3 and 5, the analog modem 502 of the present invention has one transmitter device Ta, 510, for communications over the communication channel 310, 320, and 330 in the upstream direction to the digital modem 540 of the present invention, where this transmitter device preferably has two different structures Ta,1 and Ta,2, 510a and 510b, respectively. The first transmitter structure Ta,1 510a is to be used by the analog modem of the present invention for transmission of information during start-up procedures in the upstream direction utilizing Pulse Amplitude Modulation (PAM). The general start-up procedure, in accordance with the preferred embodiment of the present invention, will be described below in conjunction with flow diagram FIG. 6.

In the preferred embodiment of the present invention the transmitter structure Ta,1, 510a, in the analog modem is not comprised of a pre-equalization structure.

The second transmitter structure Ta,2, 510b, of transmitter device 510 of the analog modem of the present invention, as shown in FIG. 5, is to be used for data transmission from the analog modem to the digital modem in the upstream direction over the communication channel 310, 320, and 330 once the start-up procedure is completed.

Transmitter structure Ta,2, 510b, in the analog modem of the preferred embodiment of the present invention is comprised of a pre-equalization structure.

It should be noted that in the preferred embodiment of the present invention, Pulse Code Modulation (PCM) scheme is utilized in the upstream direction during data transmission over the communication channel 310, 320, and 330. It also should be noted that the structure of the receiver device of the digital modem would differ in accordance with the different structures of the transmitter device in the analog modem. Hence, as indicated in FIG. 5, receiver structure Rd,1, 530a, of the receiver device 530 of the digital modem is implemented in order to receive information from Ta,1, 510a of the analog modem during the start-up procedure. And a different receiver structure, Rd,2, 530b, is implemented in order to receive the data from transmitter structure Ta,2, 510b, of the analog modem during the data transmission phase.

Referring now to flow diagram FIG. 6, the start-up procedure 610 for analog and digital modems over a communication channel having upstream and downstream directions, where PCM is utilized in the upstream direction for data transmission, will be described. In general, this start-up procedure 610 makes it possible for the analog modem's transmitter structure Ta,2, 510b, of the transmitter device 510 in FIG. 5 to be determined.

According to the preferred embodiment of the present invention, the start-up procedure 610 begins at step 620 where the analog modem 502 of FIG. 5 sends sets of signals in the upstream direction over the communication channel 310, 320, and 330 to the digital modem 540 of FIG. 5.

In general, the analog modem 502 transmits signals to the digital modem 540 which can be used to determine characteristics of the upstream direction of the communication channel once received by the digital modem 540. These signals and other details are described in the attached specification in Appendix A.

At step 630, the digital modem 540 will receive signals sent by the analog modem 502. At step 640, based upon the received signals, the calculation of the characteristics of the communication channel 310, 320, and 330 in the upstream direction occurs. It should be noted that the signals that the analog modem 502 sends to the digital modem 540 will likely be altered in such a way that the received signals will be different than the sent signals. For the calculation of the characteristics of the upstream direction of the communication channel 310, 320, and 330, the characteristics of the sent and received signals are utilized. These channel characteristics typically include the upstream channel response, digital, and analog impairments. For example, U.S. Pat. No. 6,201,842 issued Mar. 13, 2001, entitled, *Device and Method for Detecting PCM Upstream Digital Impairments in a Communication Network,* which is assigned to the assignee of the present invention and which is incorporated herein in its entirety by reference, describes a method for detecting digital impairments. Also, U.S. Pat. No. 5,887,027, entitled, *Method of Upstream Channel Modeling for PCM Modem,* which is assigned to Lucent Technologies Inc. and which is incorporated herein its entirety by reference, describes how to detect analog impairments and determine the channel response. In the preferred embodiment of the present invention, step 640 is completed by the digital modem 540.

Figure 6:
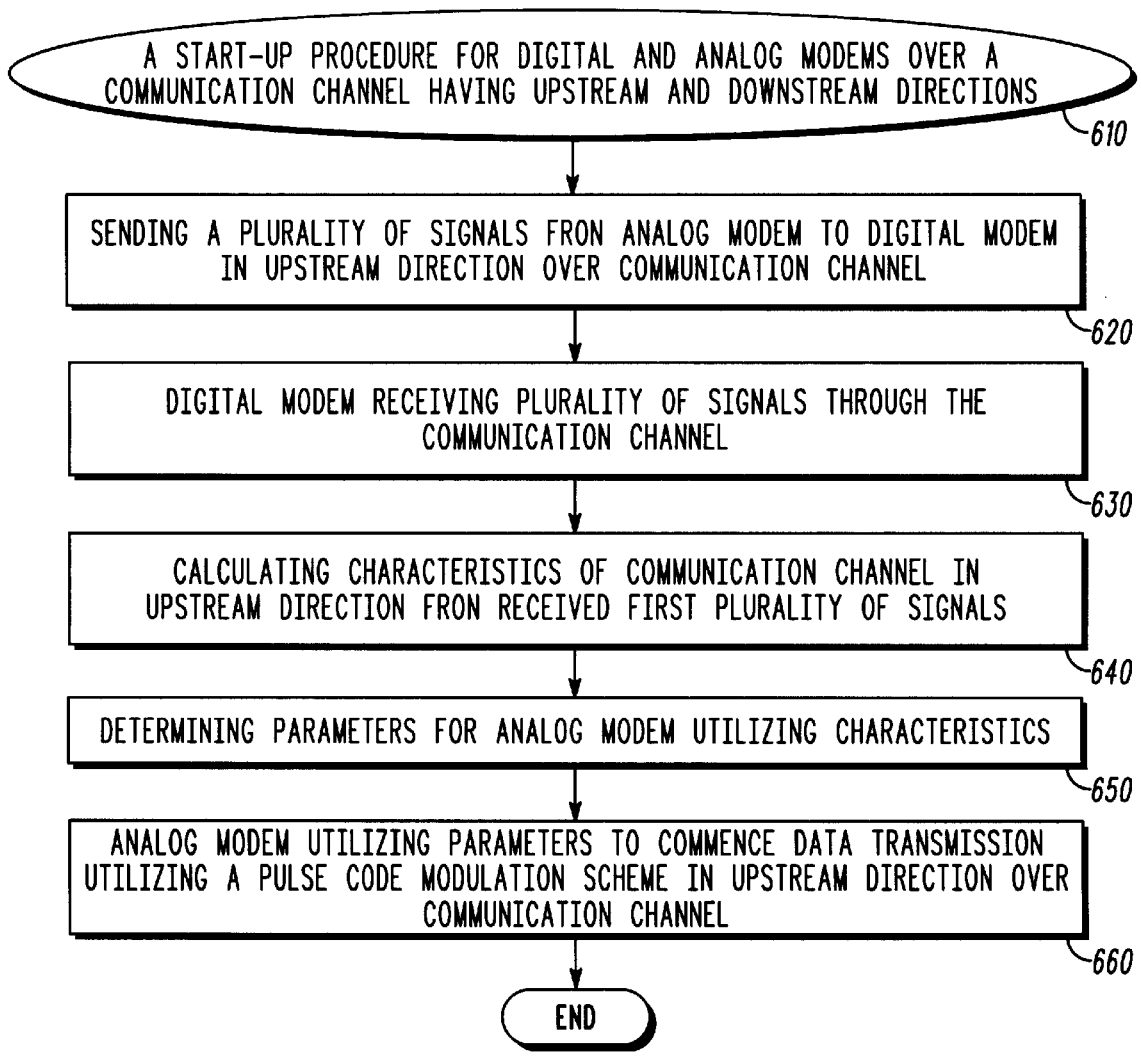
FIG. 6 is a flow diagram illustrating the steps required to perform the start-up procedure of a preferred embodiment of the present invention.

In the preferred embodiment of the present invention, the next step in FIG. 6, step 650 indicates that the digital modem 540 utilizes the characteristics that were calculated in step 640 as described above to determine a parameter set for the analog modem 502. The parameter set, as determined by the digital modem 540 in the preferred embodiment, are subsequently sent to the analog modem 502 in the downstream direction of the communication channel 310, 320, and 330.

In the preferred embodiment of the present invention, the parameter set includes, but is not limited to, such as the appropriate pre-equalization structure, constellation sets, and mapping parameters for the analog modem 502. The pre-equalization structure typically includes, but is not limited to, pre-filter and pre-coder coefficients as defined by U.S. Pat. No. 6,198,776 issued Mar. 6, 2001, entitled, *Device and Method for Pre-Coding Data Signals for PCM Transmission*, which is assigned to assignee of the present invention and which is incorporated herein in its entirety by reference. Constellation sets can be defined by U.S. application Ser. No. 08/999,254, entitled, *System, Device, and Method for PCM Upstream Transmission Utilizing an Optimized Transmit Constellation*, which is assigned to assignee of the present invention and which is incorporated herein in its entirety by reference. Mapping parameters can be defined by U.S. Pat. No. 6,201,836 issued Mar. 13, 2001, entitled, *Method and Apparatus for Combining a Trellis Coding Scheme with a Pre-coding Scheme for Data Signals*, which is assigned to assignee of the present invention and which is incorporated herein in its entirety by reference, and ITU Recommendation V.90.

At step 660, the analog modem 502 utilizes the parameter set determined above in step 650 in order to set-up (or as it is known in the art, bring"online", or put in the path of data transmission) its pre-coder 505 and pre-filter 506 structures in its transmitter structure Ta,2, 510*b*, of transmitter device 510 of FIG. 5 and thereby, commence reliable data transmission.

In the preferred embodiment of the present invention, this data transmission commenced by the analog modem 502 after the start-up procedure 610 is completed, is accomplished using Pulse Code Modulation (PCM) in the upstream direction over the communication channel 310, 320, and 330 to the digital modem 540.

In a first alternate embodiment, step 650 may be completed by the analog modem 502. In this first alternate embodiment, the characteristics calculated by the digital modem 540 in step 640 are sent to the analog modem 502 in the downstream direction of the communication channel 310, 320, and 330. The parameter set determined in step 650 by the analog modem 502 is based on the received characteristic information about the channel 310, 320, and 330. The analog modem 502 will then perform step 660, as described above in the preferred embodiment, based on the parameter set that it itself determined in step 650.

In a second alternate embodiment, step 640 may be completed by the analog modem 502. In this second alternate embodiment, the signals received by the digital modem 540 at step 630 in the preferred embodiment above, is sent to the analog modem 502 in the downstream direction of the communication channel 310, 320, and 330 for use by the analog modem 502. The analog modem 502 will then perform calculating step 650 and step 660 based on these received signals, as described above in conjunction in the preferred embodiment of the present invention.

It should be noted that in the preferred, first alternate, and second alternate embodiments of the present invention, up until step 660, the analog modem 502 does not possess adequate and complete information for its transmitter structure Ta,2, 510*b* which comprises a pre-equalization structure 504 including pre-coder 505 and pre-filter 506 structure. Hence, the pre-coder 505 and pre-filter structures 506 were not in the path of data transmission, or, not "on-line". As described above, the novel approach described in this invention is a procedure that does not require a pre-equalization structure 504 in the analog modem 502 during the start-up procedure 610, but rather completion of the start-up procedure which establishes a different transmitter structure Ta,2, 510*b* (FIG.5) that is required for reliable high-speed data transmission.

Subsequent to step 660, there is a reliable exchange of data transmission both the upstream and downstream directions of the channel 310, 320, and 330. Hence, as it is known in the art, in the data mode after step 660, the analog modem 502 will be pre-equalizing the data to account for the channel response such that the digital modem 540 is not required to implement any equalization in the digital modem 540 receiver.

In order for the digital and analog modem to experience the above exchange as described in the start-up procedure of FIG. 6, there is a need for a formal process. Broadly, the startup procedure of the preferred embodiment of the present invention contains four phases or segments. Phase I is the network interaction phase and the same as defined in ITU Recommendation V.90 specification. Phase II is the channel probing and ranging phase and is very similar to what is defined in ITU Recommendation V.90 indicating the modem capability to support PCM scheme in upstream direction. Equalizer and echo canceller training and digital impairment learning are performed in Phase III of the start-up procedure. Phase IV is the upstream channel estimation final training phase, and parameter exchange.

For a complete description of all signals and procedures for the preferred embodiment of the present invention, Phases I through IV above, refer to the attached detailed specification in Appendix A.

It should be noted that this invention might be embodied in software, firmware, and/or hardware. The software and/or firmware might be stored on a computer usable medium, such as a computer disk or memory chip.

While the invention has been described in conjunction with a specific embodiment thereof, additional advantages and modifications will readily occur to those skilled in the art. The invention, in its broader aspects, is therefore not limited to the specific details, representative apparatus, and illustrative examples shown and described. Various alterations, modifications and variations will be apparent to those skilled in the art in light of the foregoing description. Thus, it should be understood that the invention is not limited by the foregoing description, but embraces all such alterations, modifications and variations in accordance with is the spirit and scope of the appended claims.

We claim:

1. A method of performing a start-up procedure for digital and analog modems over a communication channel having upstream and downstream directions, said method comprising the steps of:

sending a plurality of signals from said analog modem to said digital modem in said upstream direction over said communication channel;

said digital modem receiving said plurality of signals through said communication channel;

calculating characteristics of said communication channel in said upstream direction from said received plurality of signals;

determining a parameter set for said analog modem utilizing said characteristics; and said analog modem utilizing said parameter set to commence data transmission utilizing a pulse code modulation scheme in said upstream direction over said communication channel.

2. The method according to claim 1, wherein said step of calculating characteristics of said channel is completed by said digital modem.

3. The method according to claim 2, wherein said digital modem sends said characteristics to said analog modem.

4. The method according to claim 3, wherein said step of determining said parameter set is completed by said analog modem.

5. The method according to claim 2, wherein said step of determining said parameter set is completed by said digital modem.

6. The method according to claim 5, wherein said digital modem sends said parameter set to said analog modem.

7. The method according to claim 1, wherein said digital modem sends said received plurality of signals through said communication channel to said analog modem.

8. The method according to claim 7, wherein said step of calculating characteristics of said channel is completed by said analog modem.

9. The method according to claim 8, wherein said step of determining said parameter set is completed by said analog modem.

10. The method according to claim 1, wherein said parameter set comprises pre-equalization structures.

11. The method according to claim 10, wherein said pre-equalization structures comprise pre-coder coefficients.

12. The method according to claim 11, wherein said pre-equalization structures further comprise pre-filter coefficients.

13. The method according to claim 12, wherein said parameter set further comprises constellation sets.

14. The method according to claim 13, wherein said parameter set further comprises mapping parameters.

15. The method according to claim 10, wherein said parameter set further comprises constellation sets.

16. The method according to claim 10, wherein said parameter set further comprises mapping parameters.

17. The method according to claim 15, wherein said parameter set further comprises mapping parameters.

18. The method according to claim 4, wherein said parameter set comprises pre-equalization structures.

19. The method according to claim 18, wherein said pre-equalization structures comprise pre-coder coefficients.

20. The method according to claim 19, wherein said pre-equalization structures further comprise pre-filter coefficients.

21. The method according to claim 20, wherein said parameter set further comprises constellation sets.

22. The method according to claim 21, wherein said parameter set further comprises mapping parameters.

23. The method according to claim 18, wherein said parameter set further comprises constellation sets.

24. The method according to claim 18, wherein said parameter set further comprises mapping parameters.

25. The method according to claim 23, wherein said parameter set further comprises mapping parameters.

26. The method according to claim 9, wherein said parameter set comprises pre-equalization structures.

27. The method according to claim 26, wherein said pre-equalization structures comprise pre-coder coefficients.

28. The method according to claim 27, wherein said pre-equalization structures further comprise pre-filter coefficients.

29. The method according to claim 28, wherein said parameter set further comprises constellation sets.

30. The method according to claim 29, wherein said parameter set further comprises mapping parameters.

31. The method according to claim 26, wherein said parameter set further comprises constellation sets.

32. The method according to claim 26, wherein said parameter set further comprises mapping parameters.

33. The method according to claim 31, wherein said parameter set further comprises mapping parameters.

34. The method according to claim 6, wherein said parameter set comprises pre-equalization structures.

35. The method according to claim 34, wherein said pre-equalization structures comprise pre-coder coefficients.

36. The method according to claim 35, wherein said pre-equalization structures further comprise pre-filter coefficients.

37. The method according to claim 36, wherein said parameter set further comprises constellation sets.

38. The method according to claim 37, wherein said parameter set further comprises mapping parameters.

39. The method according to claim 34, wherein said parameter set further comprises constellation sets.

40. The method according to claim 34, wherein said parameter set further comprises mapping parameters.

41. The method according to claim 39, wherein said parameter set further comprises mapping parameters.

42. An apparatus for performing a start-up procedure for digital and analog modems over a communication channel having upstream and downstream directions, comprising:
a first structure of a transmitter in said analog modem for sending a first plurality of signals in said upstream direction; and
a second structure of said transmitter in said analog modem for sending a second plurality of signals for data transmission in said upstream direction utilizing pulse code modulation scheme.

43. An apparatus according to claim 42, wherein said second structure of said transmitter in said analog modem further comprises a parameter set.

44. An apparatus according to claim 43, wherein said parameter set of said second structure of said transmitter are determined in response to said first plurality of signals.

45. An apparatus according to claim 42, wherein said first structure of said transmitter in said analog modem sends said first plurality of signals to a first structure of a receiver of said digital modem.

46. An apparatus according to claim 42, wherein said second structure of said transmitter in said analog modem sends said second plurality of signals to a second structure of a said receiver of said digital modem.

47. The apparatus according to claim 42, wherein said digital modem calculates characteristics of said channel.

48. The apparatus according to claim 47, wherein said digital modem sends said characteristics to said analog modem.

49. The apparatus according to claim 48, wherein said analog modem determines a parameter set.

50. The apparatus according to claim 48, wherein said digital modem determines a parameter set.

51. The apparatus according to claim 50, wherein said digital modem sends said parameter set to said analog modem.

52. The apparatus according to claim 42, wherein said digital modem sends said received first plurality of signals through said communication channel to said analog modem.

53. The apparatus according to claim 52, wherein said analog modem calculates characteristics of said channel.

54. The apparatus according to claim 53, wherein said analog modem determines said parameter.

55. The apparatus according to claim 42, wherein said parameter set comprises pre-equalization structures.

56. The apparatus according to claim 55, wherein said pre-equalization structures comprise pre-coder coefficients.

57. The apparatus according to claim 56, wherein said pre-equalization structures further comprise pre-filter coefficients.

58. The apparatus according to claim 57, wherein said parameter set further comprises constellation sets.

59. The apparatus according to claim 58, wherein said parameter set further comprises mapping parameters.

60. The apparatus according to claim 55, wherein said parameter set further comprises constellation sets.

61. The apparatus according to claim 55, wherein said parameter set further comprises mapping parameters.

62. The apparatus according to claim 60, wherein said parameter set further comprises mapping parameters.

63. The apparatus according to claim 49, wherein said parameter set comprises pre-equalization structures.

64. The apparatus according to claim 63, wherein said pre-equalization structures comprise pre-coder coefficients.

65. The apparatus according to claim 64, wherein said pre-equalization structures further comprise pre-filter coefficients.

66. The apparatus according to claim 65, wherein said parameter set further comprises constellation sets.

67. The apparatus according to claim 66, wherein said parameter set further comprises mapping parameters.

68. The apparatus according to claim 63, wherein said parameter set further comprises constellation sets.

69. The apparatus according to claim 63, wherein said parameter set further comprises mapping parameters.

70. The apparatus according to claim 68, wherein said parameter set further comprises mapping parameters.

71. The apparatus according to claim 54, wherein said parameter set comprises pre-equalization structures.

72. The apparatus according to claim 71, wherein said pre-equalization structures comprise pre-coder coefficients.

73. The apparatus according to claim 72, wherein said pre-equalization structures further comprise pre-filter coefficients.

74. The apparatus according to claim 73, wherein said parameter set further comprises constellation sets.

75. The apparatus according to claim 74, wherein said parameter set further comprises mapping parameters.

76. The apparatus according to claim 71, wherein said parameter set further comprises constellation sets.

77. The apparatus according to claim 71, wherein said parameter set further comprises mapping parameters.

78. The apparatus according to claim 76, wherein said parameter set further comprises mapping parameters.

79. The method according to claim 51, wherein said parameter set comprises pre-equalization structures.

80. The method according to claim 79, wherein said pre-equalization structures comprise pre-coder coefficients.

81. The method according to claim 80, wherein said pre-equalization structures further comprise pre-filter coefficients.

82. The method according to claim 81, wherein said parameter set further comprises constellation sets.

83. The method according to claim 82, wherein said parameter set further comprises mapping parameters.

84. The method according to claim 79, wherein said parameter set further comprises constellation sets.

85. The method according to claim 79, wherein said parameter set further comprises mapping parameters.

86. The method according to claim 84, wherein said parameter set further comprises mapping parameters.

* * * * *